W. E. WOODARD.
TRAILER TRUCK FOR LOCOMOTIVES.
APPLICATION FILED JAN. 14, 1922.

1,423,895. Patented July 25, 1922.

Inventor
William E. Woodard.
By F. W. Cornwall
Att'y.

UNITED STATES PATENT OFFICE.

WILLIAM E. WOODARD, OF FOREST HILLS, NEW YORK.

TRAILER TRUCK FOR LOCOMOTIVES.

1,423,895. Specification of Letters Patent. Patented July 25, 1922.

Application filed January 14, 1922. Serial No. 529,227.

*To all whom it may concern:*

Be it known that I, WILLIAM E. WOODARD, a citizen of the United States, residing at Forest Hills, county of Queens, State of New York, have invented a certain new and useful Improvement in Trailer Trucks for Locomotives, of which the following is a full, clear, and exact description, such as will enable others skilled in the art to which it appertains to make and use the same, reference being had to the accompanying drawings, forming part of this specification.

My invention relates to locomotives, particularly to the construction of locomotive trailer trucks and their assembly with the locomotive frames.

One object of my invention is to provide a trailer truck frame which, in effect, is a cantilever fulcrumed upon the trailer truck wheels and axle and which transfers a substantial portion of the downward stresses of and on the rear end of the locomotive frame into upward stresses on the locomotive frame at a point spaced from its rear end.

Another object of my invention is to eliminate one or more equalizer bars by thus making the trailer truck frame itself an equalizer between the points of its connection to the locomotive frame.

Additional objects of my invention are to eliminate various elements and connections accompanying the usual trailer truck equipped with equalizers and to thereby provide a simpler, more economical and more durable trailer truck construction without any sacrifice of efficiency.

In the accompanying drawings which illustrate a selected embodiment of my invention,—

Figure 1:
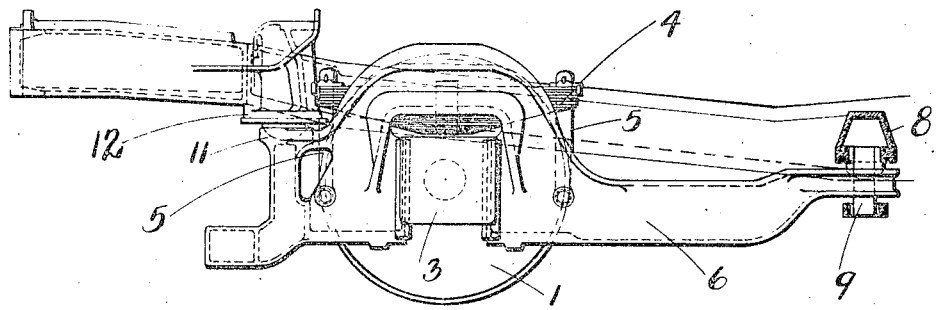
Figure 1 is a side elevation of my improved trailer truck applied to the rear end of a locomotive frame.
Figure 2:
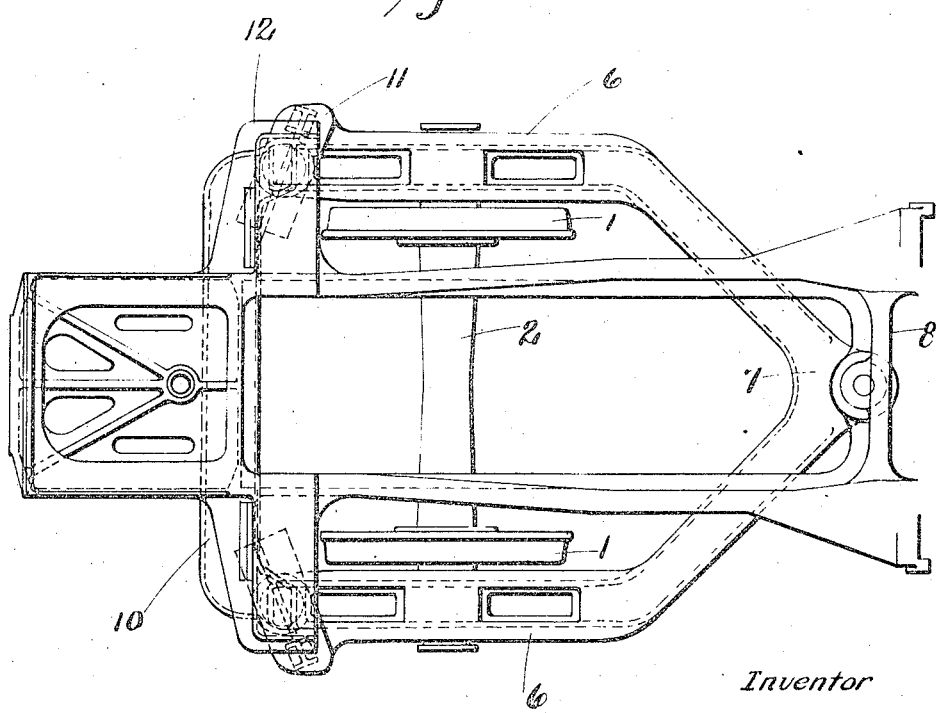
Figure 2 is a top view of my truck and the adjacent portion of the locomotive frame shown in Figure 1.

In these drawings, the trailer truck wheels 1 are fixed upon the truck axle 2 which mounts journal boxes 3 of the usual type. Semi-elliptic springs 4 are carried by journal boxes 3 and links 5 are pivotally connected to the opposite ends of springs 4. The trailer truck frame which is suspended from springs 4 by means of links 5, extends longitudinally of the locomotive in both directions from axle 2, and is recessed at the axle to receive journal boxes 3.

The trailer truck frame preferably comprises sides 6 which converge at their forward ends to a point 7 which forms a pivot bearing adapted to seat in a cross member 8 on the locomotive frame and to be pivotally connected thereto by a king pin 9. The rear ends of sides 6 are connected by a cross beam 10 and the truck frame is provided near its rear end with spaced bearings 11 adapted to support cooperating bearings 12 on the locomotive frame and permit free transverse movement of this portion of the locomotive frame relative to the rear of the trailer frame as may be caused by travel of the locomotive around a curve.

It will be noted that the trailer truck frame is pivotally and exclusively supported by the trailer truck wheels and axle. A load applied to the forward end of the trailer truck frame would tend to tilt the rear end of the truck frame upwardly, and a load applied at the rear end of the truck frame will tend to tilt its forward end upwardly. Each of these tilting tendencies is limited by the engagement of the rising end of the truck frame with the adjacent portion of the locomotive frame. While the load carried by the trailer truck is thus equalized between the two points where it supports the locomotive frame, the load is borne entirely by the trailer truck wheels and is not carried in part by the locomotive driving wheels. This avoids the use of equalizing levers between the trailer truck and the locomotive drivers, while retaining the flexibility characteristic of equalizer construction.

I contemplate the usual variations in construction of my improved truck frame and in the details of its application to a locomotive frame, without departing from the scope of the invention, as set forth in the following claims.

I claim:

1. A locomotive trailer truck including a frame adapted to be supported by truck wheels between its ends and adapted to support a locomotive frame at both of its ends.

2. In a locomotive trailer truck, wheels and axle, journal boxes mounted on said axle, springs extending longitudinally of the truck and carried on said journal boxes, links pivoted on opposite ends of said springs, and a trailer truck frame suspended by said links.

3. In a locomotive trailer truck, wheels and axle, journal boxes mounted on said axle, longitudinal springs mounted on said journal boxes, a trailer truck frame supported from the opposite ends of said springs exclusively, a locomotive frame supporting seat at one end of said trailer truck frame, and locomotive frame supporting bearings at the opposite end of said trailer truck frame.

4. A locomotive trailer truck comprising wheels and axle, a frame forming a cantilever fulcrumed on said wheels and axle and secured to the locomotive frame at a point spaced inwardly thereof from said wheels and axle and supporting the locomotive frame at a point spaced outwardly thereof from said wheels and axle.

5. In a locomotive, a locomotive frame provided with an overhanging portion, and a trailer truck comprising wheels and axle and a cantilever cushioned thereon with its unsecured end supporting the overhanging portion of said locomotive frame.

6. In a locomotive trailer truck, wheels and axle, journal boxes mounted on said axle, springs mounted on said journal boxes, a trailer truck frame supported on said springs exclusively, and locomotive frame supporting seats at opposite ends of said trailer truck frame.

In testimony whereof I hereunto affix my signature this day of Jan. 5th, 1922.

WILLIAM E. WOODARD.